United States Patent [19]

Felber et al.

[11]  4,252,194
[45]  Feb. 24, 1981

[54] METHOD OF USING POLYMERIZED LIGNOSULFONATES FOR MOBILITY CONTROL

[75] Inventors: Betty J. Felber; Dwight L. Dauben, both of Tulsa, Okla.

[73] Assignee: Standard Oil Company (Indiana), Chicago, Ill.

[21] Appl. No.: 70,945

[22] Filed: Aug. 30, 1979

[51] Int. Cl.³ .............................................. E21B 43/82
[52] U.S. Cl. .................... 166/302; 166/273; 166/274
[58] Field of Search ............... 166/252, 272, 273, 274, 166/275, 302, 305 R; 175/72; 252/8.55 D

[56] References Cited

U.S. PATENT DOCUMENTS

| | | | |
|---|---|---|---|
| 3,168,511 | 2/1965 | King et al. ..................... | 252/8.5 C X |
| 3,402,137 | 9/1968 | Fischer et al. ................... | 166/275 X |
| 3,476,188 | 11/1969 | Harvey ................................. | 166/274 |
| 3,897,827 | 8/1975 | Felber et al. .......................... | 166/270 |
| 4,006,779 | 2/1977 | Kalfoglou ........................ | 166/273 X |
| 4,074,757 | 2/1978 | Felber et al. ..................... | 166/272 X |
| 4,172,498 | 10/1979 | Kalfoglou ............................ | 166/273 |

*Primary Examiner*—James A. Leppink
*Assistant Examiner*—George A. Suchfield
*Attorney, Agent, or Firm*—Robert B. Stevenson

[57] ABSTRACT

An improved method for mobility control application in viscous oil reservoirs including (a) heating a lignosulfonate solution, prior to injection into an oil bearing formation, for a period of time sufficient to produce a more viscous lignosulfonate solution (e.g., 8% sodium lignosulfonate held at 375° F. for 50 hours yielding a 86 cp fluid @ 84 sec$^{-1}$ measured at room temperature), (b) cooling the resulting heat treated lignosulfonate fluid to a reservoir condition and (c) injecting this fluid into the formation. Fluids produced in this manner are useful as mobility buffers during a waterflood or a micellar flood process.

9 Claims, 2 Drawing Figures

METHOD OF USING POLYMERIZED LIGNOSULFONATES FOR MOBILITY CONTROL

BACKGROUND OF THE INVENTION

1. Field of Invention

The present invention relates to an improved method for mobility control. More specifically, it is concerned with the use of a heat treated lignosulfonate fluid for mobility control particularly during a water or micellar flood process and the like.

2. Description of the Prior Art

High molecular weight polymers are currently used for improving sweep in reservoirs caused by permeability contrast or by an unfavorable mobility ratio and the like. They are also employed as a mobility buffer in the micellar flood process. Various polymers have been proposed, tested, and used, particularly in recent field pilot tests of various so-called tertiary recovery processes, but experience has brought out some limitations. For example, of the two most frequently suggested polymer types, polyacrylamides and biopolymers, each have less than ideal behaviors. The polyacrylamides are highly sensitive to shear, temperature, and salinity of injection water. Biopolymers are subject to bacterial degradation and injectivity problems because of the cell walls which are produced along with the polymer during manufacture. Expensive diatomaceous earth filtration is frequently required to remove the cell walls prior to injecting the polymer. Both polymer types propagate poorly in tight rock. In addition to these technical shortcomings, the cost effectiveness of the prior art polymers (i.e., the cost per unit mobility reduction produced) can be improved. In view of the prior art polymers, there is considerable incentive to develop polymers that would be more effective and/or more economical.

Although lignosulfonates have been suggested and used successfully as gelable plugging fluids, up to this time they have been ineffective as viscosity builders unless high concentrations are used. However, at the greater than 30% concentration levels necessary for significant viscosity buildup, the expense is excessive.

SUMMARY OF THE INVENTION

We have discovered a method for controlling the mobility of fluids during injection and propagation of fluids in a subterranean formation comprising the steps of: (a) heating a solution of a lignosulfonate to a temperature in excess of about 200° F. for a period of time sufficient to raise the viscosity of the resulting heat treated lignosulfonate fluid without gelling the lignosulfonate, (b) cooling the heat treated lignosulfonate solution prepared in step (a) such as to inhibit further viscosity buildup or gelation, and (c) injecting the cooled heat treated lignosulfonate solution of step (b) into a subterranean formation to promote mobility control.

A primary objective of this invention is to provide a new and inexpensive viscous polymeric fluid for use in mobility control during injection of fluids into a subterranean formation such as an oil bearing formation and the like. Accordingly, the invention provides a viscous fluid derived from heating a sodium or ammonium lignosulfonate solution. In the case of ammonium lignosulfonate, heating at a temperature of at least 200° F. for a period sufficient to increase the solution viscosity at least 25% is provided. While, a more severe heating at a temperature of at least 300° F. for the sodium lignosulfonate for a period sufficient to increase the viscosity a comparable degree is provided. At a temperature near the lower values of the respective ranges, a heating period of approximately 50 hours is provided with decreasing time at respectively higher temperatures. Such viscous lignosulfonate fluids can be employed as the polymer flood slug during a micellar flooding process and as the polymer solution (or bank) during a polymer flood or waterflood.

DESCRIPTION OF THE PREFERRED EMBODIMENTS

Figure 1:
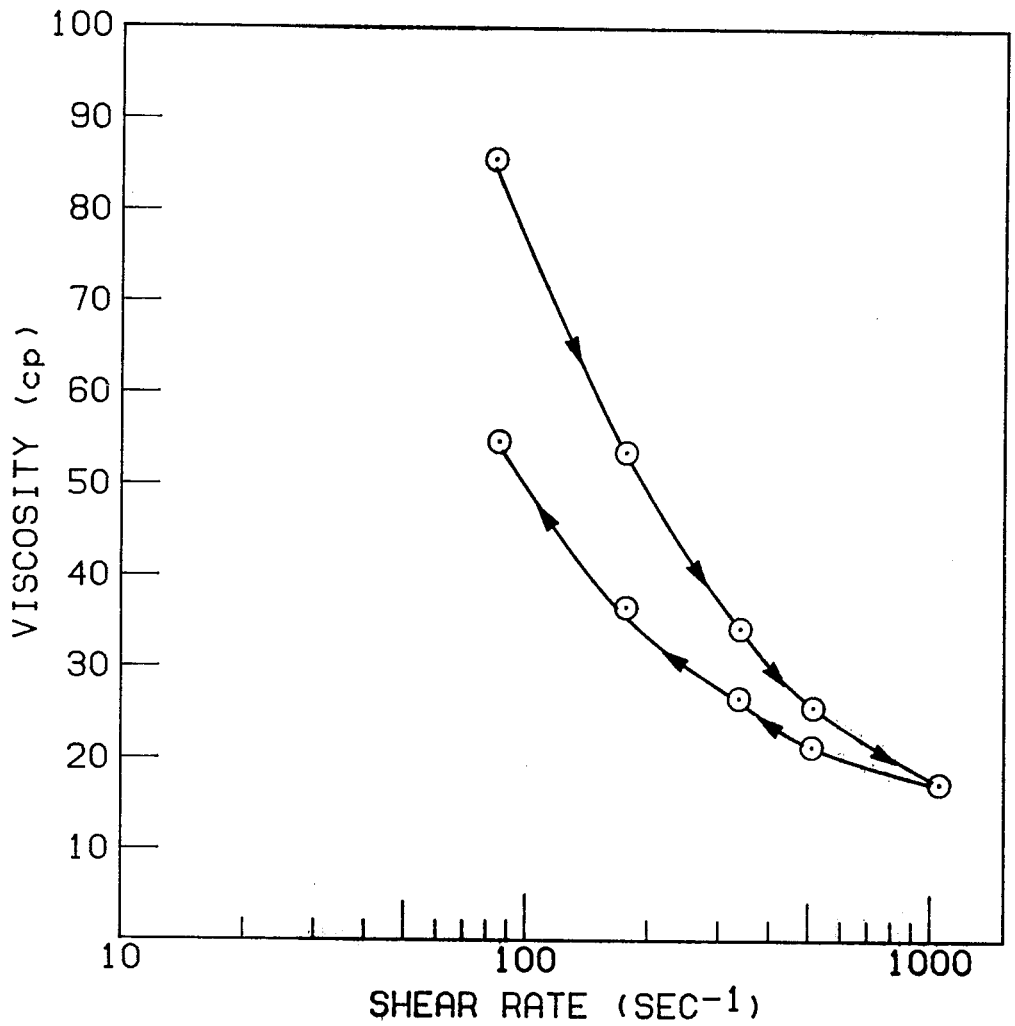
FIG. 1 of the drawing illustrates the viscosity as a function of shear rate for an 8% sodium lignosulfonate solution which was heated at 375° F. for 50 hours.

In order to produce a viscous polymeric fluid derived from a lignosulfonate solution which will be an acceptable commercial substitute to the presently used polyacrylamides and biopolymers, we started initially with either a relatively dilute solution or a commercially available concentrate of water-soluble salts of lignosulfonate produced as byproducts of the wood pulp industry. These dilute solutions contained lignosulfonates at concentrations from 2 to about 10 weight percent. These values represent the lower end of the preferred concentration range with considerably higher concentrations being equally as useful. Thus, the commercially available concentration of lignosulfonate solutions with solids content as high as 55 weight percent or less are acceptable as starting solutions for the heat treatment step. In cases where higher than necessary concentrations are employed during heating, subsequent dilution to the appropriate viscosity for injection will be necessary.

In performing the heat treatment of the lignosulfonate solution, the selection of the time and temperature should be such that the resulting reaction product is a viscous fluid and not a firm gel. In other words, gelation of the lignosulfonate solution as known in the literature and as implemented in sweep control applications is not a desirable result of the heat treatment in the present invention. In making this distinction, it should be remembered that an object of the present invention is to produce a water-soluble viscous polymeric fluid which, when injected into a subterranean formation, will form a fluid bank which will maintain its integrity and identity as it propagates through the formation (mobility control) thus uniformly displace and drive the fluids in front of it. In contrast, if the gelled or gelable lignosulfonate solution is used, the gel sets up in the formation and plugs off a portion of the formation preventing further fluid flow and causing the subsequent injected fluids to flow elsewhere. In the present application involving mobility control, viscosity is the critical concern. Whereas in the prior art sweep control, gelation is the critical concept. In this regard, the time, temperature, and concentration relationship as found in U.S. Pat. No. 4,074,757 is considered undesirable for mobility control applications and represents an absolute upper limit which should be stayed away from during the heat treatment of the lignosulfonate solution. In view of this, U.S. Pat. No. 4,074,757 is incorporated by reference as descriptive of the upper limit in which the solutions gel to a firm semi-solid mass.

As indicated in the U.S. Pat. No. 4,074,757, the gel time for a lignosulfonate solution at various temperatures and concentrations (the upper limit to the heating treatment) will vary significantly depending on the cation associated with the lignosulfonate polymer. Specifically, the ammonium lignosulfonate solutions at concentrations between 5 and 10 weight percent will gel after about 600 to 800 hours at about 300° F. and will gel as quickly as 4 to 5 hours at 450° F. The sodium lignosulfonate solution at similar concentrations will require more severe conditions to promote gelation; e.g., about 700 to 1000 hours at 350° F. and 8 to 10 hours at 450° F.

A similar trend involving the ammonium species being more reactive at less severe conditions relative to the sodium lignosulfonate species is observed for the desired onset of viscosity buildup without promoting gelation. Thus, our experience indicates that a temperature in excess of 300° F. is preferred for the sodium lignosulfonate while a temperature of about 200° F. has in fact caused a significant buildup of viscosity in a very concentrated solution of ammonium lignosulfonate.

In order to demonstrate the heat treatment aspect of the present invention, approximately 80 ml of an 8 weight percent solution of lignosulfonate was placed in a 100 ml windowed pressure cell. The 8 weight percent solution was prepared by diluting a liquid sodium lignosulfonate concentrated crude material of about 50 percent solids content with distilled water. This particular sample is identified by the trade name Raylig ® 261L and is produced by ITT Rayonier, Inc. from pulped 97 percent softwood and 3 percent hardwood. The stainless steel windowed pressure cell was pressurized to 500 psig by injecting nitrogen and then heated at 375° F. for 50 hours. After this heat treatment, the lignosulfonate solution was cooled to room temperature and the respective viscosity of the reaction product was measured as a function of shear rate from approximately 100 sec$^{-1}$ up to 1000 sec$^{-1}$ and then back to 100 sec$^{-1}$ using a Fann viscometer. The initial viscosity (after heat treatment and cooling) was 86 cp at a shear rate of 100 sec$^{-1}$. This compares favorably to the expected viscosity of 1.28 cp for a non-heat treated 8 weight percent sodium lignosulfonate solution and represents a significant viscosity buildup. The data measured in this experiment are plotted in FIG. 1 with the arrow indicating the respective time sequence of viscosity versus shear rate measurements. As illustrated, the measured viscosity decreased with increasing shear rates as should be expected. As the shear rate was decreased back to the original 100 sec$^{-1}$ value, the measurements returned along a curve of lower viscosities. Although the reason for this observation is not fully understood, the magnitude of the effect is not viewed as being inconsistent with mobility control. Thus the behavior of the heat treated lignosulfonate solution should be similar to what is experienced when using other polymeric viscosity building agents of the prior art. The absolute values of the viscosity at the stated concentration is viewed as being compatible with commercial scale applications. These values relative to viscosity as a function of concentration prior to heat treatment represents a major economic incentive to use the heat treated lignosulfonate.

Figure 2:
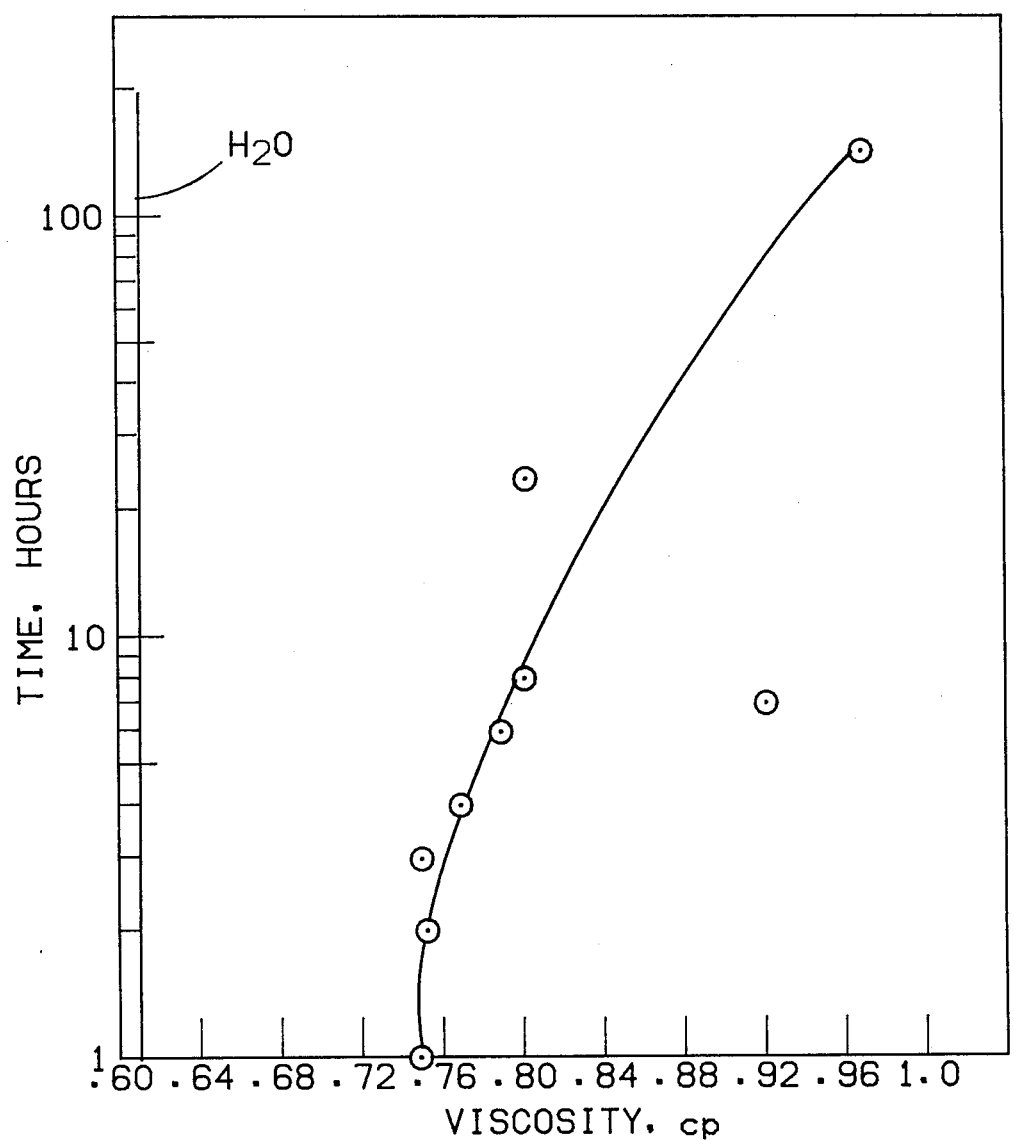
FIG. 2 of the drawing illustrates the viscosity change as a function of time for a 2% ammonium lignosulfonate solution at 110° F.

To further exemplify the heat treatment aspect, a concentrated solution of commercial grade ammonium lignosulfonate was charged to a pressure vessel similar to the previous example. In this particular run, the sample was a liquid ammonium lignosulfonate concentrate crude material of 50 to 60 percent solids derived from pulping 100 percent softwood. It was manufactured by the Scott Paper Company plant at Everett, Washington and sold under the trade name TREX ® LTA. The concentrated solution was heated at 190° F. for a sustained period of time. Samples were withdrawn hourly for the first 8 hours, at 24 hours, and finally at one week. These heat treated samples were diluted to 2 percent by weight in a 30,000 ppm sodium chloride solution. Viscosity measurements on the resulting viscous, nongelled solutions were made at 12 rpm in a Brookfield viscometer, Model LVT with UL adaptor. Viscosity data as a function of time for the 2 percent solution are plotted in FIG. 2 along with the viscosity of water at 110° F. After 8 hours, the TREX ® LTA had attained a viscosity of about 0.80 cp compared to 0.61 cp for water and had attained approximately a 25 percent increase in viscosity after 50 hours relative to no heat treatment. Again, this indicates that even dilute solutions, although not necessarily within an optimum viscosity range, do in fact exhibit viscosity buildup without gelation upon heat treatment.

As illustrated in the above examples, the heat treatment can be performed on a diluted lignosulfonate solution or on a concentrated crude with subsequent dilution prior to injection. Furthermore, viscosity buildup will occuur without gelation even at extremely low concentrations provided the time/temperature limitations for gelation, as known in the literature, are not exceeded. The pH of the lignosulfonate solution to be heat treated will range from definitely acidic to slightly basic, about 7.5, and preferably the pH should be such that it is between 2.8 and 4.2, most preferably about 3.4. As the conditions for heat treatment become more severe, the time required to achieve the desired viscosity change will decrease. For purposes of this invention, a relative increase of approximately 25 percent fluid viscosity at a fixed concentration is considered a significant change and will correspond to an economic incentive to commercially employ the heat treated lignosulfonate rather than the non-heat treated solution. Particularly in viscous oil reservoirs, any time you can achieve a viscosity increase of two-fold and higher over that of the in place water, the fluid will have potential as a mobility control agent.

After heat treatment, the lignosulfonate solutions are cooled to prevent any further viscosity buildup or risk of gelation. This cooling can in principle be accomplished by any of the methods well known in the art of cooling aqueous polymeric fluids. The degree of cooling, or the temperature to which the fluid is cooled, will depend to a great extent on such pragmatic considerations as what is the formation temperature at which injection is to take place or what transportation and handling problems are contemplated.

The degree of cooling will also be dependent on the specific cation associated with the lignosulfonate; e.g., ammonium lignosulfonates will probably require lower temperatures than sodium lignosulfonates. These variables to a great extent can be incorporated into the design of a given job merely by selecting the correct species according to the conditions of the formation and the anticipated duration of the injection. In the past, it has been generally felt that 160° F. and below are the only safe temperatures to maintain commercially available lignosulfonate concentrate solutions. However, for the diluted lignosulfonate solutions, this is too restrictive; particularly because their gel times are in excess of hundreds of hours. It should also be kept in mind that certain additives (particularly dichromates) will chemically promote cross linking and gelation of lignosulfonates which may interfere with successful mobility control.

The injection of the viscous heat treated lignosulfonate can be performed according to any of the methods for polymeric fluid injection well known in the petroleum industry. In particular, the contemporary polymer flooding techniques are considered compatible with the viscous lignosulfonates produced herein. Also, the various techniques of using polymer solutions as fluid banks to preserve the micellar fluid zone as it passes through oil bearing formations during the so-called tertiary recovery of oil is considered compatible with the viscous lignosulfonates. In principle, heat treated lignosulfonates are envisioned as direct substitutes for polymers such as polyacrylamides and various biopolymers presently being injected into subterranean formations for various purposes related to mobility control (e.g., production of oil, displacement of water, placement of solvents and the like).

The lignosulfonates used in preparing the viscous nongelled solutions of our invention are a byproduct of the wood pulp industry and are generally supplied in the form of a concentrated aqueous solution of ammonium salt, or as a powdered ammonium, alkaline metal, or alkaline earth metal salt. Ammonium lignosulfonates are formed by cooking wood chips in a digester under controlled conditions of temperature (140° to 150° F.) and pressure with ammonium bisulfite and sulfur dioxide. The ammonium bisulfite and the sulfur dioxide react with the lignin contained in wood to form water soluble lignosulfonates. The resulting product is a complex mixture of ammonium lignosulfonates, wood sugars and other carbohydrates. Simple filtration removes the lignosulfonate (10 percent solids) from the wood pulp. Sodium lignosulfonate is produced in an analagous manner with sodium bisulfite being used rather than ammonium bisulfite.

The powdered lignosulfonates show considerable filterable solids after they are put in the solution, and therefore should be filtered before use to avoid face plugging of the injection well. Generally speaking, the commercially available compositions contain from about 50 to 60 percent solids with a maximum of about 80 percent of these solids being lignosulfonates with the balance consisting of sulfur, reducing sugars, ash, and nitrogen. The reducing sugar content of these compositions generally range from about 2 to about 20 percent. The sodium and ammonium lignosulfonates supplied in liquid form generally are found to be free of objectionable amounts of filterable solids. Ammonium lignosulfonate is also considered to be particularly desirable because of the low cost and relatively uniform properties including a tendency to resist biological degradation.

Sodium lignosulfonate has the additional advantage of lower risk of gelling at a given temperature; therefore, it is considered the more desirable form for very hot reservoirs and/or long injection times. However, the sodium form is somewhat more susceptible to biological degradation, therefore requiring the use of a preservative such as sodium benzoate, sodium pentachlorothenate or the like.

Having thus described the preferred embodiments, the invention is not to be construed as limited to the particular forms disclosed and tested since these are to be regarded as illustrative rather than restrictive. Therefore, the following claims are intended to cover all processes which do not depart from the spirit and scope of using a heat treated viscous lignosulfonate polymeric fluid as a mobility control agent during fluid injection into an oil bearing formation.

We claim:

1. A method for controlling the mobility of fluids during injection and propagation of fluids in a subterranean formation comprising the steps of:
   (a) heating a solution of a lignosulfonate to a temperature in excess of about 200° F. for a period of time sufficient to raise the viscosity of the resulting heat treated lignosulfonate fluid without gelling the lignosulfonate,
   (b) cooling said heat treated lignosulfonate solution prepared in Step (a) such as to inhibit further viscosity buildup or gelation, and
   (c) injecting said cooled heat treated lignosulfonate solution of Step (b) into a subterranean formation to promote mobility control.

2. A method of claim 1 wherein the lignosulfonate is selected from the group consisting of sodium lignosulfonate and ammonium lignosulfonate.

3. A method of claim 2 wherein the lignosulfonate is ammonium lignosulfonate and said heating is at a temperature of at least 200° F. for a period sufficient to increase the viscosity at least 25%.

4. A method of claim 2 wherein the lignosulfonates is sodium lignosulfonate and said heating is at a temperature of at least 300° F. for a period sufficient to increase the viscosity at least 25%.

5. A method of claim 3 or claim 4 wherein the heating at a temperature near the lower portion of said respectively identified temperature ranges is approximately 50 hours with decreasing time at higher temperatures.

6. A method of claim 3 or 4 wherein said injection is as the polymer buffer slug during a micellar flooding process.

7. A method of claim 3 or 4 wherein said injection is as the polymer solution during a polymer waterflood.

8. A method of claim 1 or 2 wherein said injection is as the polymer buffer slug during a micellar flooding process.

9. A method of claim 1 or 2 wherein said injection is as the polymer solution during a polymer waterflood.

* * * * *